United States Patent [19]
Yoneyama

[11] Patent Number: 5,657,154
[45] Date of Patent: Aug. 12, 1997

[54] MONITORING SYSTEM FOR ALL OPTICAL REGENERATORS

[75] Inventor: Kenichi Yoneyama, Tokyo, Japan

[73] Assignee: NEC Corporation, Tokyo, Japan

[21] Appl. No.: 631,207

[22] Filed: Apr. 12, 1996

[30] Foreign Application Priority Data

Apr. 12, 1995 [JP] Japan .................... 7-085832

[51] Int. Cl.$^6$ .................................. H01S 3/00
[52] U.S. Cl. ................. 359/341; 359/176; 359/177
[58] Field of Search ......................... 359/176, 177, 359/341

[56] References Cited

U.S. PATENT DOCUMENTS

| | | | |
|---|---|---|---|
| 4,278,850 | 7/1981 | Sato et al. | 359/177 |
| 5,436,750 | 7/1995 | Kawano | 359/177 |
| 5,440,418 | 8/1995 | Ishimura et al. | 359/177 |
| 5,500,756 | 3/1996 | Tsushima et al. | 359/174 |
| 5,502,810 | 3/1996 | Watanabe | 359/177 |
| 5,510,925 | 4/1996 | Suzuki et al. | 359/177 |
| 5,513,029 | 4/1996 | Roberts | 359/177 |

OTHER PUBLICATIONS

Yano et al., "Noise Compression and Waveform Restoration by an Optical Signal Regenerator", *Optical Fiber Communication '95 Conference Edition Technical Digest*, vol. 8, WH4, pp. 127–129.

*Primary Examiner*—Mark Hellner
*Attorney, Agent, or Firm*—Sughrue, Mion, Zinn, Macpeak & Seas

[57] ABSTRACT

A monitoring system for all optical regenerators comprises at least one all optical regenerator including an optical signal amplifier for directly amplifying and outputting main optical signals, which are inputted, and optical terminal equipments, connected to the all optical regenerator or regenerators, for delivering and supplying the main optical signals. Each all optical regenerator is provided with a monitor information delivering section for superposing monitor information, representing the internal information of the regenerator, over the main optical signals and delivering monitor optical signals. Each optical terminal equipment comprises a monitor information extractor section for receiving the monitor optical signals and extracting the monitor information from them and a monitor section for monitoring the regenerator according to the monitor information. Each all optical regenerator may also be provided with a regenerator section for regenerating the main optical signals. Each all optical regenerator may further be provided with a reshaping section for reshaping the waveform of the main optical signals or a retiming section for retiming the main optical signals. The monitor information from the monitor information delivering section is superposed over the main optical signals by phase modulation. Each main optical signal contains a clock optical signal for giving a clock to this main optical signal, and a monitor information superposing section superposes the monitor information over the clock optical signals. The present invention provides a monitoring system which is cleared of the disadvantages of conventional monitoring systems and applicable to all optical regenerators as well.

36 Claims, 9 Drawing Sheets

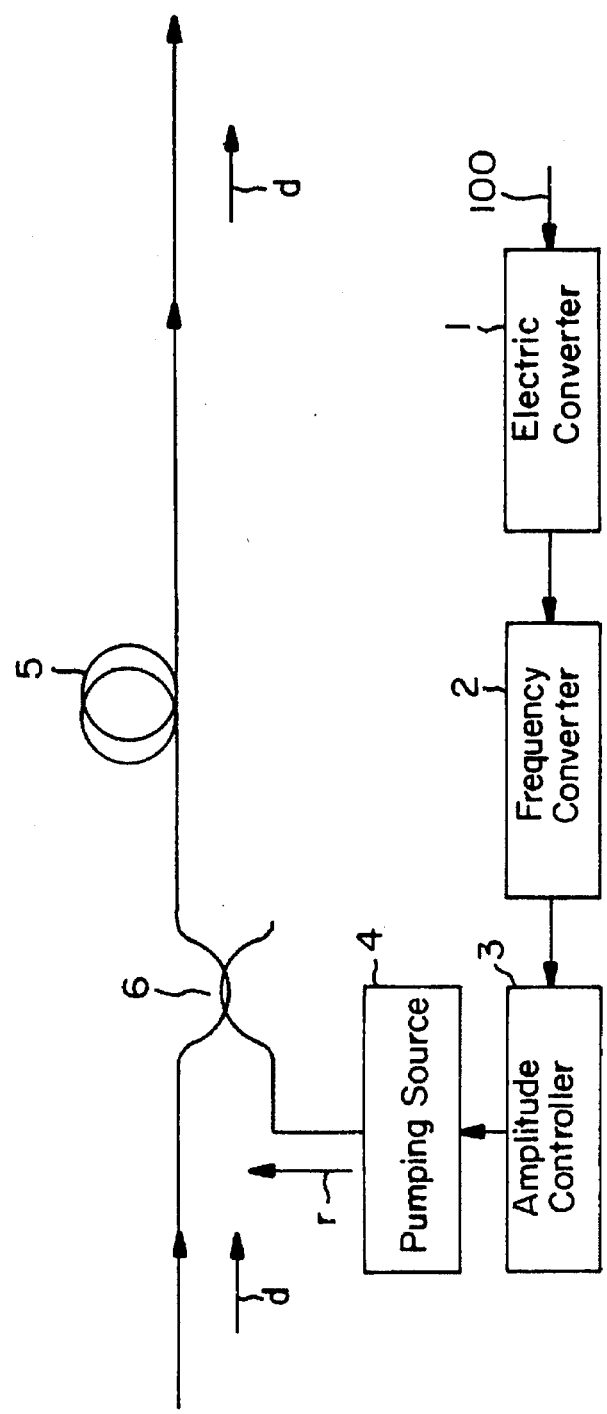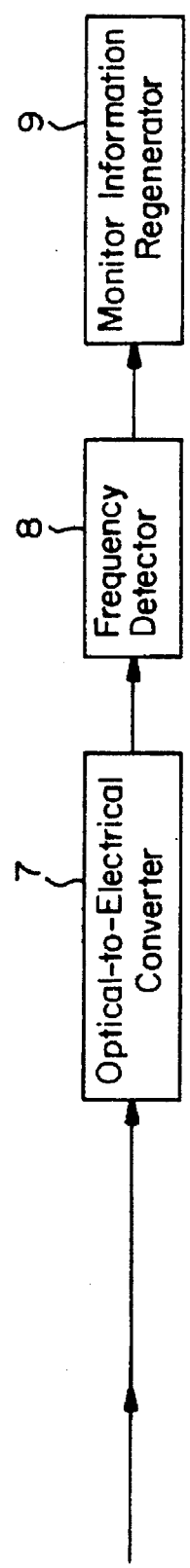

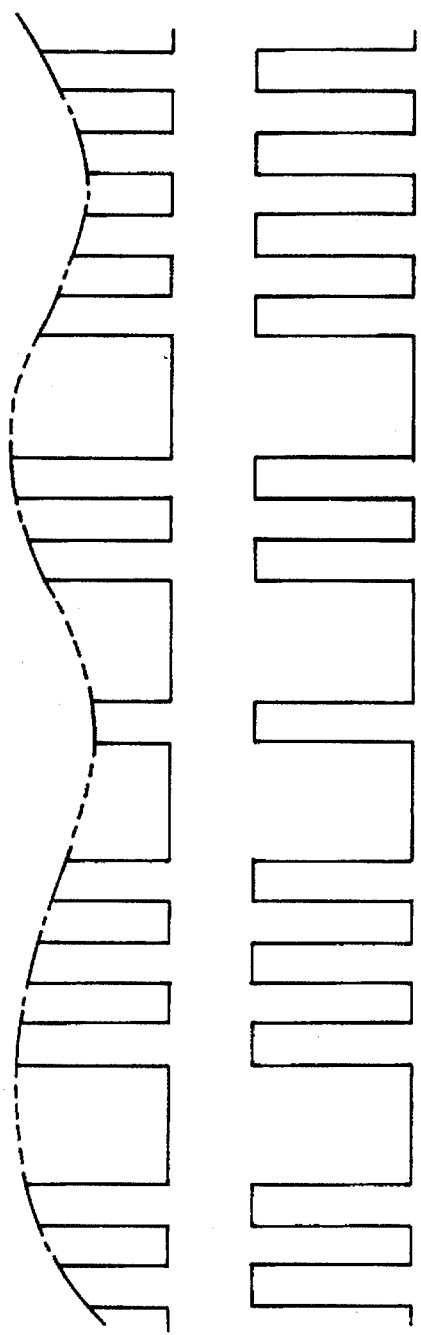
FIG.3A PRIOR ART ①
FIG.3B PRIOR ART ②
FIG.3C PRIOR ART ③

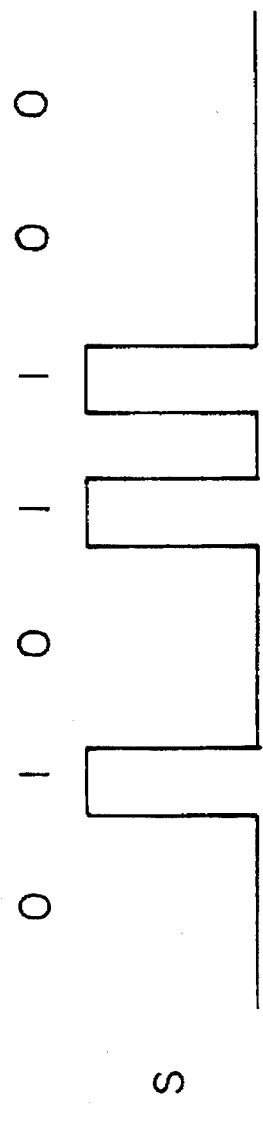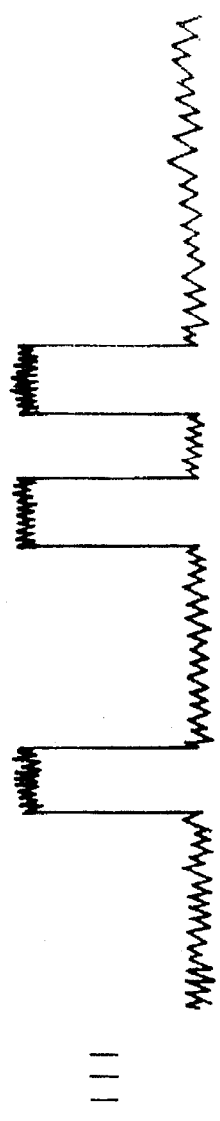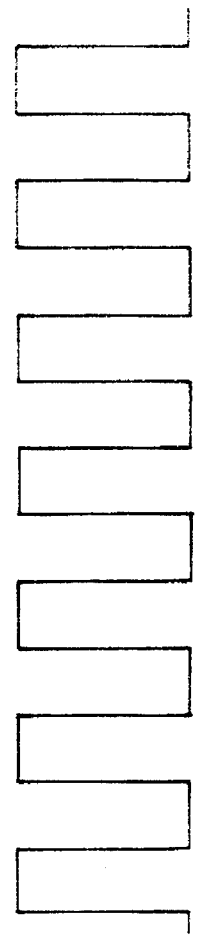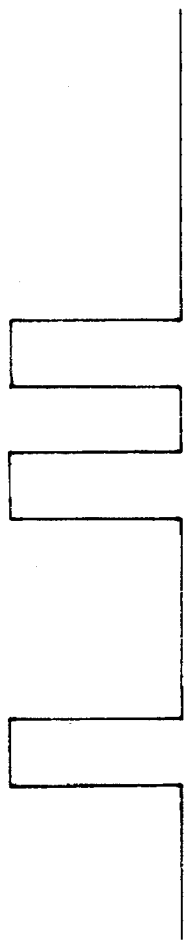
FIG.6A
FIG.6B
FIG.6C
FIG.6D

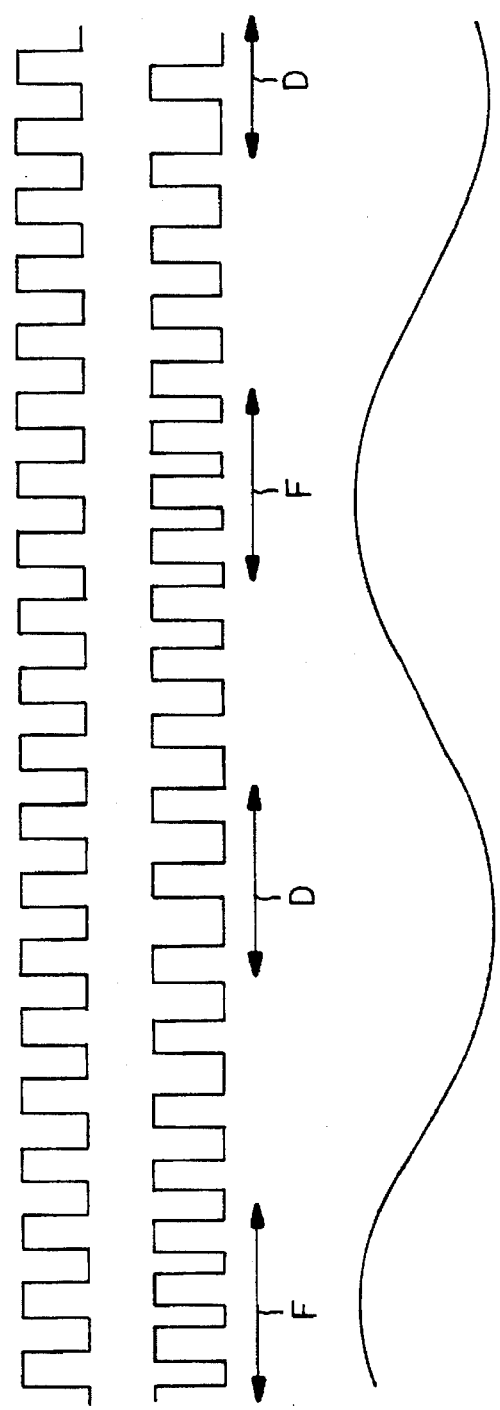
FIG.7A ①
FIG.7B ②
FIG.7C ③

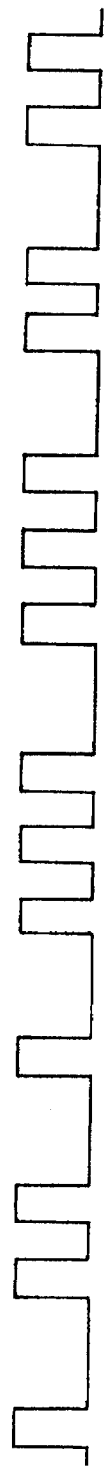
FIG.8A
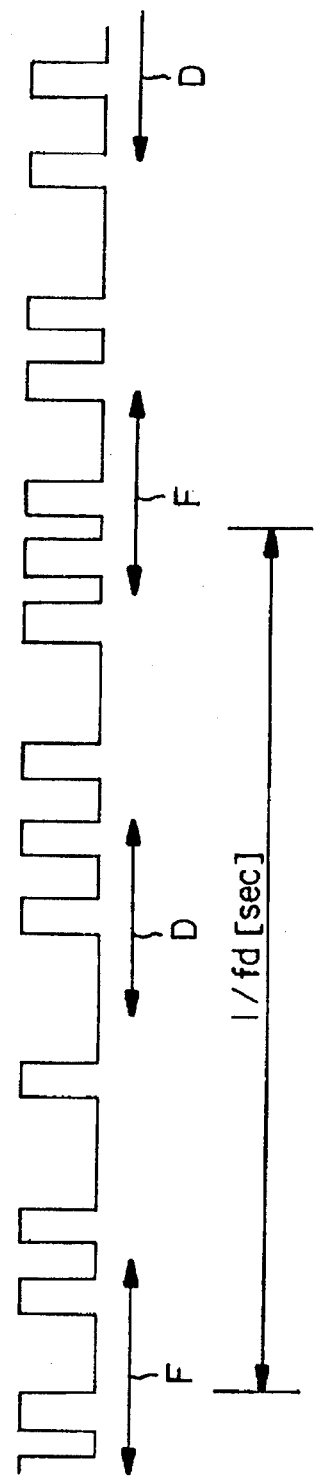
FIG.8B
FIG.8C
FIG.8D

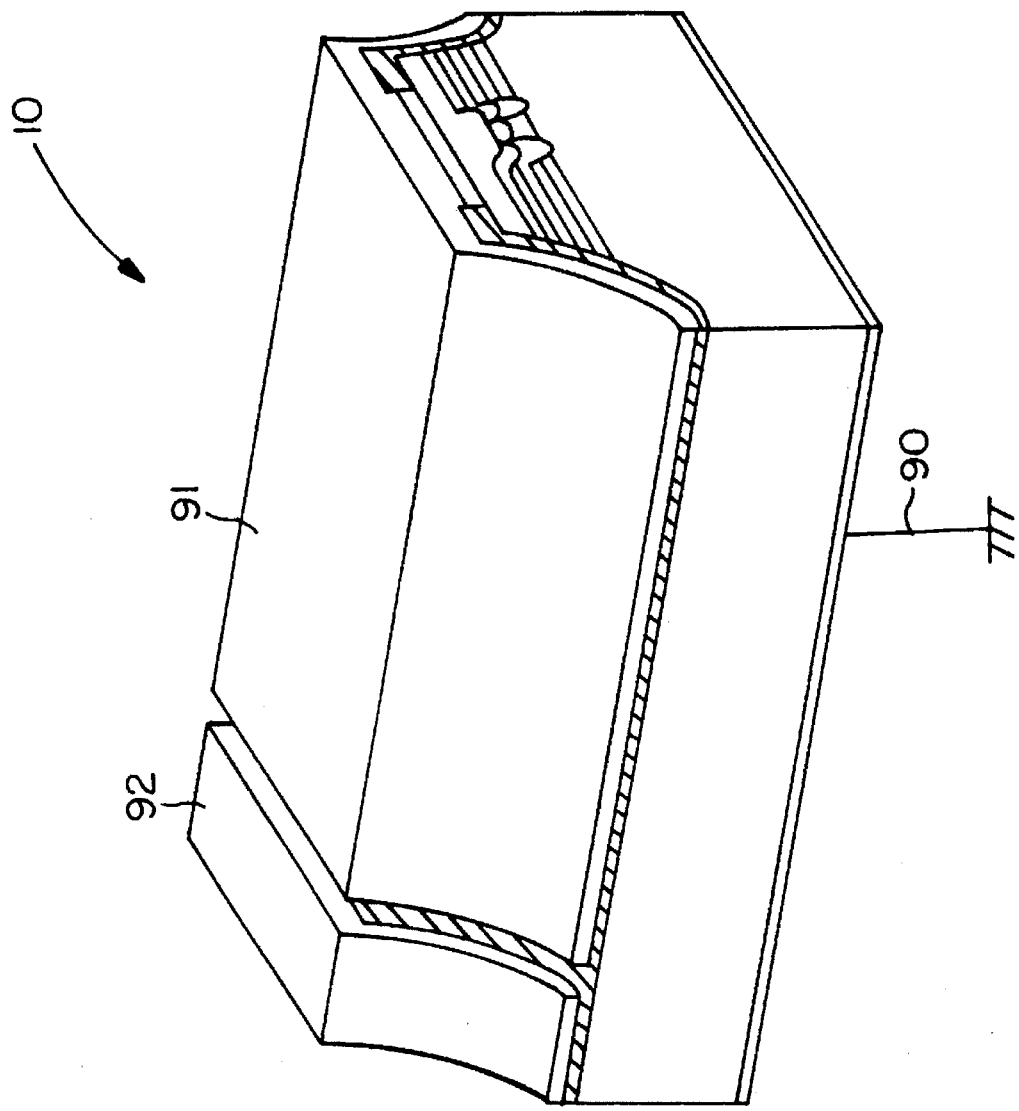

MONITORING SYSTEM FOR ALL OPTICAL REGENERATORS

BACKGROUND OF THE INVENTION

1. Field of the Invention

The present invention relates to a monitoring system for optical regenerators, and more particularly for all optical regenerators having such functions as reshaping, regeneration and retiming.

2. Description of Related Art

Optical repeaters are used in long distance optical repeating transmission systems including optical submarine cable systems. In an optical repeating transmission system in which an optical terminal equipment and an optical repeater are connected to each other by an optical transmission fiber, it is of critical importance to the construction and maintenance of the system to monitor the operating state of the installed optical repeater.

Especially in an optical submarine cable system, once an optical repeater is installed, if the repeater runs into trouble, it will cost enormous time and money to retrieve and repair the faulty repeater. Therefore, even the slightest trouble is impermissible for the repeater, which has to be reliable enough to remain usable for a long period after installation without needing maintenance work. Furthermore, it is essential to monitor the whole system so that, should any trouble arise, switching over to a standby unit could be immediately achieved.

According to the prior art, optical amplifiers, which directly amplify transmitted optical signals as they are without converting them into electrical signals, are used as the aforementioned optical repeaters. Optical amplifiers used as repeaters are known as optical amplifying repeaters. A conventional optical amplifying repeater monitors the state of each part within itself with monitor signals. Such an optical amplifying repeater is provided with an electric converter for converting each monitor signal into a voltage corresponding to its content, a frequency converter for converting this voltage into an electric signal having a repetition frequency corresponding to the voltage, and an amplitude controller for controlling the amplitude of the electric signal having gone through this frequency conversion. Such a conventional optical amplifying repeater also has a pumping source whose driving current is amplitude-modulated by monitor signals, which are amplitude-controlled by the amplitude controller, and an optical coupler for leading the output of this pumping source to an optical amplification fiber.

As optical amplification fiber, an optical fiber doped with erbium, which is a rare earth element, is commonly used. As signal light, a ray of 1.55 μm in wavelength is used, and as excitation light, one of 1.48 μm in wavelength is employed. As optical coupler, an optical wavelength division multiplexer is used with a view to efficient coupling of the signal light and the excitation light.

An optical signal, when entered in an excited state resulting from the input of excitation light to the erbium-doped fiber, is amplified with a certain gain and outputted. In a conventional optical repeater, said monitor signal is superposed over the main signal by the amplitude modulation of this gain itself, and delivered outside.

Incidentally, all optical regenerators are now attracting note as optical repeaters for the optical repeating transmission systems of the next generation. Characteristically, they can reshape, amplify, regenerate and retime optical signals as they are. Repeaters having any two out of the three functions of reshaping, amplification and regeneration are known as optical 2R regenerators. Similarly, repeaters having all of said three functions are known as optical 3R regenerators. Known studies on regeneration include one contained in OFC (Optical Fiber Communication) '95 Conference Edition Technical Digest, Volume 8, WH4, "Noise compression and waveform restoration by an optical signal regenerator."

Optical repeating transmission systems having these functions involve the problem of inapplicability to conventional monitoring systems because they regenerate optical systems. Namely, in such conventional monitoring systems, monitor signals are superposed over the main signals by amplitude modulation. Therefore, when the main signals are regenerated, the amplitude modulation is removed and the monitor signals superposed over the main signals are lost. Accordingly, there is needed a monitoring system which is applicable to the aforementioned all optical regenerators as well.

SUMMARY OF THE INVENTION

An object of the present invention is to provide a monitoring system which is cleared of the disadvantages of conventional monitoring systems and applicable to all optical regenerators as well.

According to the invention, there is provided a monitoring system for all optical regenerators comprising at least one all optical regenerator including an optical signal amplifier for directly amplifying and outputting main optical signals, which are inputted, and optical terminal equipments, connected to the all optical regenerator or regenerators, for delivering and supplying the main optical signals. Each all optical regenerator is provided with a monitor information delivering section for superposing monitor information, representing the internal information of the regenerator, over the main optical signals and delivering monitor optical signals. Each optical terminal equipment comprises a monitor information extractor section for receiving the monitor optical signals and extracting the monitor information from them and a monitor section for monitoring the regenerator according to the monitor information.

In the monitoring system for all optical regenerators according to the invention, each all optical regenerator may also be provided with a regenerator section for regenerating the main optical signals. In the monitoring system for all optical regenerators according to the invention, each all optical regenerator may further be provided with a reshaping section for reshaping the waveform of the main optical signals or a retiming section for retiming the main optical signals.

In the monitoring system for all optical regenerators according to the invention, the monitor information from the monitor information delivering section is superposed over the main optical signals by phase modulation. In the monitoring system for all optical regenerators according to the invention, each main optical signal contains a clock optical signal for giving a clock to this main optical signal, and a monitor information superposing section superposes the monitor information over the clock optical signals.

In a more specific configuration, each all optical regenerator may further include an optical coupler section for branching and synthesizing the clock optical signals for the main optical signals and an optical discriminator for regenerating the main optical signals. The optical discriminator includes an AND circuit for subjecting the main optical signals and the clock optical signals to AND operation.

The monitor information superposing section is further provided with a laser diode and a laser diode controller section for controlling the repetition frequency of bias signals to be fed to the laser diode according to the content of the monitor information. The laser diode controller section further comprises an electric converter section for converting the monitor information into voltages according to its content from time to time; a frequency converter section for converting each voltage into an electric signal having a repetition frequency corresponding to the voltage; and an amplitude controller section for controlling the amplitude of the electric signals. The monitor information superposing section is provided with a bias circuit for supplying a direct bias current of a specified level and an adder circuit for subjecting the bias current and the monitor signals, whose amplitude is controlled by the amplitude controller section, to level addition and outputting the resultant addition signals. The laser diode is driven by these addition signals.

The all optical regenerator uses a mode locked laser diode in extracting clock light from the main optical signals. According to the present invention, by applying the mode locked laser diode for the superposition of said monitor signals, the monitor signals are superposed over the clock light. After the superposition, as stated above, the main optical signals and the clock optical signals are subjected to AND operation.

In the monitoring system for all optical regenerators according to the invention, the optical coupler section consists of a first optical directional coupler and a second optical coupler, arranged downstream of the optical amplifier. The first optical directional coupler branches part of the amplified main optical signals, and outputs branched amplified beams. The second optical directional coupler is connected to the first optical directional coupler, the laser diode and the optical discriminator. As the main optical signals are brought to incidence on the laser diode by the first optical directional coupler, the clock light extracted and outputted by the mode locked laser diode is entered into the optical discriminator.

The all optical regenerator used in this invention subjects the main optical signals entered from the first optical directional coupler and the clock light extracted by the mode locked laser diode and entered via the second optical directional coupler to AND operation. Subjecting the main optical signals and the clock light to AND operation makes it possible to superpose the monitor signals, which have been superposed over the clock light by phase modulation, over the regenerated main optical signals by phase modulation.

In the monitoring system for all optical regenerators according to the invention, each all optical regenerator is further provided with a second optical amplifier downstream of the optical discriminator to further amplify the main optical signals over which the monitor optical signals are superposed by the optical discriminator. Erbium-doped optical fiber amplifiers are used as optical amplifiers.

At the same time, in the monitoring system for all optical regenerators according to the invention, the monitor information extractor section of each optical terminal equipment is provided with a phase detector, a frequency detector and a monitor information regenerator. The phase detector demodulates received optical signals to convert them into demodulated electric signals. The frequency detector detects a specific frequency from the demodulated electric signals to extract monitor signals. The monitor information regenerator regenerates monitor information from the monitor signals.

Since the monitoring system according to the invention delivers optical signals over which monitor information is superposed by phase modulation, it is subject to no loss of monitor information after regeneration even if it is applied to 3R regenerators or the like.

BRIEF DESCRIPTION OF THE DRAWINGS

The above-mentioned and other objects, features and advantages of the present invention will become more apparent from the following detailed description when taken in conjunction with the accompanying drawings, wherein:

FIG. 1 is a block diagram illustrating the configuration of a monitoring system for optical repeaters according to the prior art;

FIG. 2 is a block diagram illustrating the configuration of an optical terminal equipment in the monitoring system according to the prior art;

FIGS. 3A–3C are signal waveform diagrams illustrating the state of a main optical signal over which a monitor signal is superposed in the monitoring system according to the prior art;

FIGS. 6A–6D are diagrams for describing the regenerating function of the optical discriminator of the optical regenerator shown in FIG. 4;

FIGS. 7A–7C are phase demodulation waveform diagrams for the all optical regenerator shown in FIG. 4;

FIGS. 8A and 8B are optical signal waveform diagrams in the cases where the signals are phase-modulated and unmodulated, and FIGS. 8C and 8D are eye pattern diagrams in the cases where the signals are phase-modulated and unmodulated;

FIG. 12 shows an external view of one example of a mode locked laser diode for use in the monitoring system for all optical regenerators according to the invention.

DETAILED DESCRIPTION OF THE PREFERRED EMBODIMENT

Figure 4:
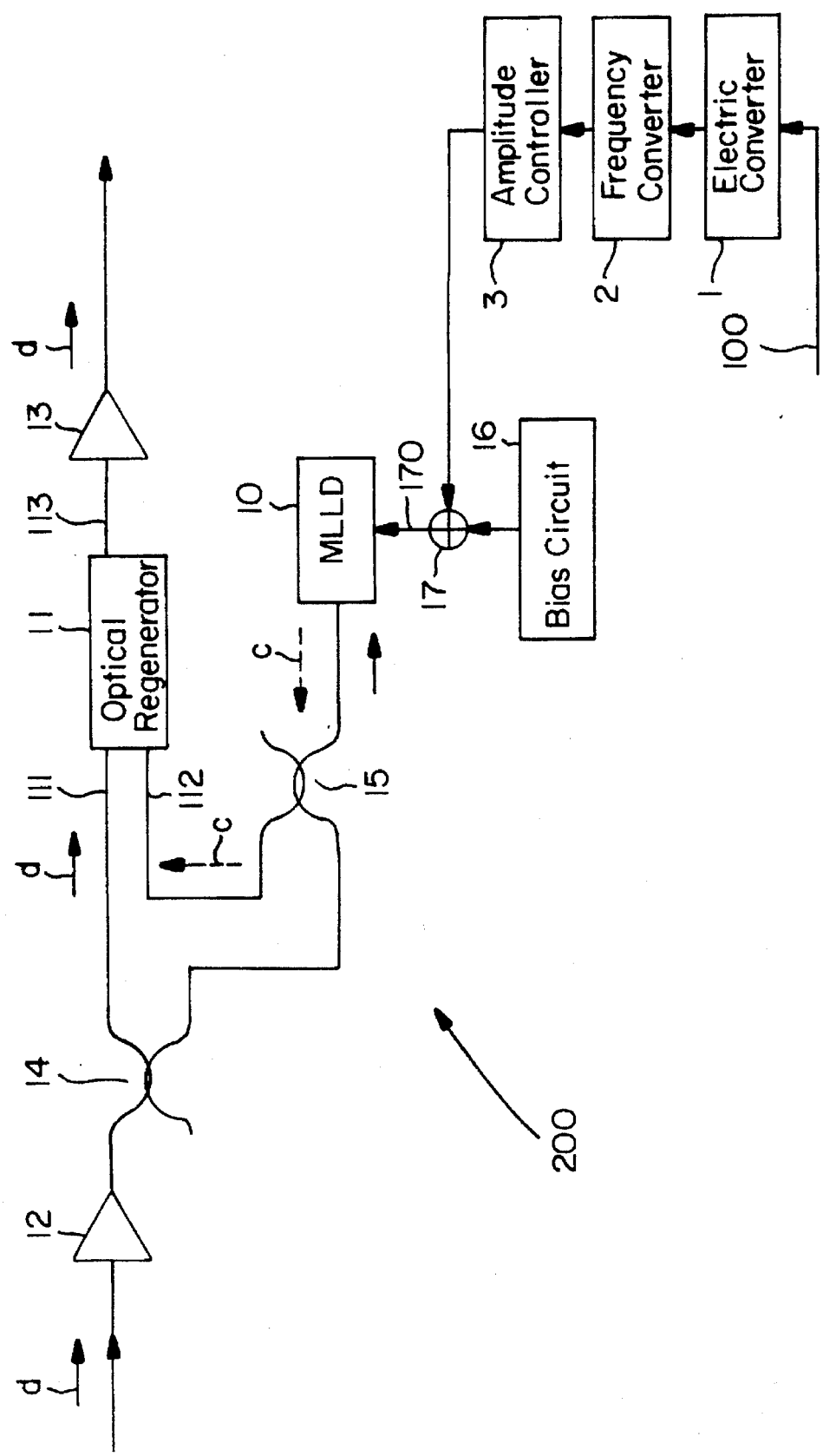
FIG. 4 is a block diagram illustrating the configuration of an optical regenerator in a monitoring system for all optical regenerators, which is a preferred embodiment of the invention.
Figure 5:
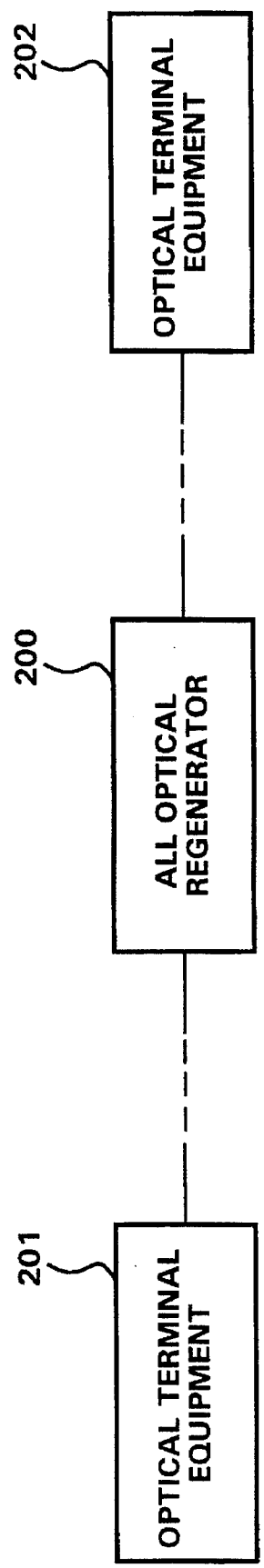
FIG. 5 is a block diagram illustrating the overall configuration of the monitoring system for all optical regenerators according to the invention.

First, before describing the configuration of a monitoring system for all optical regenerators according to the present invention, that of a monitoring system for optical repeaters according to the prior art will be described with a view to facilitating the understanding of the invention.

FIG. 1 is a block diagram illustrating the configuration of a monitoring system for optical repeaters according to the prior art. In the diagram, an optical repeater according to the prior art is provided with an electric converter 1 for converting monitor signals 100 representing the states of different parts within the repeater into voltages corresponding to contents indicating those states. The optical repeater also has a frequency converter 2 and an amplitude controller 3. The frequency converter 2 converts each voltage into an electric signal having a repetition frequency corresponding to that voltage. The amplitude amplifier 3 controls the amplitude of the electric signals resulting from the frequency conversion.

The optical repeater is further equipped with a pumping source 4 for supplying excitation light and an optical multiplexer 6 for leading the excitation light to an optical amplification fiber 5. Arrows d and r in the diagram respectively represent the main signal light and the excitation light.

A driving current to the pumping source 4 is amplitude-modulated with monitor signals whose amplitude is controlled by the amplitude controller 3. As a result, the excitation light supplied from the pumping source 4 is also intensity-modulated. In the conventional monitoring system for optical repeaters, monitor information is superposed over main signals by varying the gain of the optical amplifier by intensity-modulating the excitation light.

FIG. 2 is a block diagram illustrating the means to restore monitor signals in an optical terminal equipment in the monitoring system according to the prior art. Referring to FIG. 2, an optical receiver is provided, for the purpose of detecting monitor signals superposed over main signals in the optical repeater, with an optical-to-electric converter 7, a frequency detector 8 and a monitor information regenerator 9. The optical-to-electric converter 7 converts optical signals coming incident from an optical transmission fiber. The frequency detector 8 extracts monitor signals by detecting a specific frequency from the electric signals resulting from conversion by the optical-to-electric converter 7. The monitor information regenerator 9 regenerates monitor information from the extracted monitor signals.

The optical signals coming incident from the transmission fiber have monitor signals superposed over them by amplitude modulation. By demodulating these monitor signals, the states of different parts in the optical repeater can be monitored from the optical terminal equipment.

However, as optical signals are regenerated in an all optical regenerator transmission system, which is expected to become the optical repeater system of the next generation, it cannot be applied to the conventional monitoring system. FIGS. 3A–3C illustrate the waveforms of optical signals. FIG. 3A shows the waveform of the optical signals as it is, while FIG. 3B shows the waveform after the superposition of monitor signals over them by amplitude modulation in the monitoring system according to the prior art.

Thus, in FIG. 3B, the part of waveform shown in broken line represents the superposed monitor signals. However, regeneration of this waveform would give waveform shown in FIG. 3C, whose amplitude is the same as that of the original waveform (1). Therefore, the conventional monitoring system cannot be applied to the next generation optical repeater system using the aforementioned 3R repeaters or the like.

Next will be described in detail a monitoring system for all optical regenerators, which is a preferred embodiment of the present invention, with reference to drawings. FIG. 4 is a block diagram illustrating the configuration of an optical regenerator in .the monitoring system for all optical regenerators. The same parts as in FIG. 1 are denoted by respectively the same reference symbols. In FIG. 4, arrows d and c respectively represent signal light and clock light.

The all optical regenerator in this embodiment of the invention is provided with an electric converter 1, a frequency converter 2 and an amplitude controller 3. The electric converter 1 converts monitor information 100 representing different parts in the repeater into voltages corresponding to its contents. The frequency converter 2 converts the voltages into electric signals having repetition frequencies corresponding to those voltages. The amplitude of the electric signals resulting from the frequency conversion is controlled by the amplitude controller 3.

The all optical regenerator according to the invention also has a bias circuit 16, a level adder circuit 17 and a mode locked laser diode 17. The bias circuit 16 outputs a direct bias current of a specified level. This output bias current and signals whose amplitude is controlled by the amplitude controller 3 (hereinafter called "monitor signals") undergo level addition by the level adder circuit 17. The mode locked laser diode 10 is driven by an addition output 170 resulting from the level addition. Optical clocks are thereby extracted from optical signals.

The all optical regenerator in the monitoring system according to the invention is further equipped with optical amplifiers 12 and 13, optical directional couplers 14 and 15, and an optical regenerator 11. The optical amplifiers 12 and 13 have a function to amplify the optical signals to an output level required for signal processing and transmission. The optical directional couplers 14 and 15 either branch or synthesize the optical clocks for the optical signals when processing the optical signals. The optical regenerator 11 has a function to discriminate and regenerate optical signals. The functions of the optical amplifiers 12 and 13, the optical directional couplers 14 and 15 and the bias circuit 16 are essential for the all optical regenerator.

A plurality of all optical regenerators 200, each having the above-described configuration are, arranged between optical terminal equipment 201 and 202. The monitor information in each repeater is transmitted to the optical terminal equipment 201 or 202, which is thereby enabled to monitor the repeaters installed even in remote locations.

The discriminating and regenerating function of said optical regenerator 11 will now be described with reference to FIG. 6, which illustrates the waveforms of input and output signals of the optical regenerator 11. The same parts as in FIG. 4 are denoted by respectively the same reference signs.

Referring to FIGS. 6A–6D, generally, when an original optical signal S ("0101100") (FIG. 6A) is transmitted, it takes the noise-involving waveform of an optical signal 111 in FIG. 6B. When the optical signal 111 and an optical clock 112 (FIG. 6C) are entered into the optical regenerator 11, they are subjected to AND operation, resulting in the noise-free waveform of an optical signal 113 in FIG. 6D. If each repeater is provided with a function to discriminate and regenerate noise-distorted signals, optical signals can be accurately transmitted even to optical terminal equipments in remote locations.

Referring back to FIG. 4, the monitor information 100 representing the states of different parts in the repeater is converted by the electric converter 1 into voltages. Each of these voltages is converted by the frequency converter 2 into an electric signal having a repetition frequency corresponding to that voltage. Thus, electric signals having repetition frequencies corresponding to the contents of the monitor information are generated.

The electric signals generated by this frequency converter 2 are amplitude-controlled by the amplitude controller 3. The controlled signals, i.e. the monitor signals, are subjected to level addition to a bias current by the adder circuit 17.

The bias current is thereby amplitude-modulated with the monitor signals. The amplitude-modulated addition output 170 drives the mode locked laser diode 10. As a result, the optical clocks extracted by the mode locked laser diode 10 are phase-modulated. Thus, whereas the bias current from the bias circuit 16 is a direct current, the repetition frequency of the bias current is variably controlled with the monitor signals as control signals.

As described above, as the bias current of the mode locked laser diode 10, which extracts and outputs the optical clocks, is amplitude-modulated, periodic lags of the repetition frequency of the clock light occur according to the repetition frequency of the monitor signal, which is the modulation signal. As a result, the optical clocks extracted by the mode locked laser diode 10 are phase-modulated.

Next, the waveforms generated by said phase modulation will be described with reference to FIGS. 7A–7C, which illustrates a normal clock beam (FIG. 7A), a phase-modulated clock beam (FIG. 7B) and a monitor signal (FIG. 7C). The repetition frequencies are somewhat exaggerated in FIGS. 7A–7C to facilitate understanding.

Referring to FIGS. 7A–7C, the phase-modulated clock beam in FIG. 7B is slightly earlier in period F, and slightly later in period D, in signal transition timing than the normal clock beam in FIG. 7A. For instance, it is now supposed that, when the repetition frequency of the normal clock beam in FIG. 7A is 10 (GHz), that of the clock beam in FIG. 7B is 10.1 (GHz) in period F and 9.9 (GHz) in period D, and this repetition frequency periodically varies. The waveform corresponding to those variations is the monitor signal in FIG. 7C.

Here it is seen that, if the period during which the monitor signal is superposed over the clock beam in FIG. 7A is counterposed to digital information "1" and the period during which no superposition takes place is counterposed to digital information "0", digital information can be superposed over the clock beam. Therefore, in this embodiment of the invention, monitor information representing the states of different parts in the all optical regenerators is superposed over the clock beam.

Subjecting the clock beam over which monitor signals are superposed to AND operation with optical signals 111 in the optical regenerator 11 results in accurate transmission of the optical signals to any optical terminal equipment in a remote location. At the optical terminal equipment, monitor information is demodulated from the optical signals. The demodulation is carried out by comparison with a normal clock beam by, for instance, an AND circuit. Referring to FIGS. 7A–7C, as the transmitted optical signals are detected and processed with a normal clock beam, the monitor signals are extracted.

The contents of the monitor information may include, for example, identifying information to specify a repeater, information to specify an object of monitoring and the state of the monitored object itself. The objects of monitoring conceivably include, for instance, the amperage of the bias current to the mode locked laser diode, input signals to the optical amplifier 12, output signals of the optical amplifier 13, and internal signals of the two optical amplifiers 12 and 13.

FIGS. 8A–8C comprise optical signal waveform diagrams and eye pattern diagrams when the signals are phase-modulated and unmodulated. FIGS. 8A–8C show an optical signal after regeneration by the optical regenerator 11 using the clock beams shown in FIGS. 7A and 7B. It also shows the waveform (FIG. 8A) of an unmodulated optical signal and that (FIG. 8B) of a modulated optical signal, and their corresponding eye pattern diagrams (FIG. 8C) and (FIG. 8D).

As shown in FIG. 8A, the clock repetition frequency of the optical signal having undergone no phase modulation is constant. In terms of the eye pattern of the optical signal, as shown in FIG. 8C, no jitter is present in its waveform.

By contrast, the clock repetition frequency of the phase-modulated optical signal varies periodically. In terms of its eye pattern, as shown in FIG. 8D, jitter represented by arrow J is seen to be superimposed over the optical signal waveform. The varying period of the jitter is equal to the repetition frequency fd(Hz) of the electric signal resulting from the amplitude modulation of the bias current to the mode locked laser diode 10. This is equal to the frequency of FIG. 7C.

Next will be described the configuration of the frequency converter 2 used in the preferred embodiment of the present invention.

Figure 9:
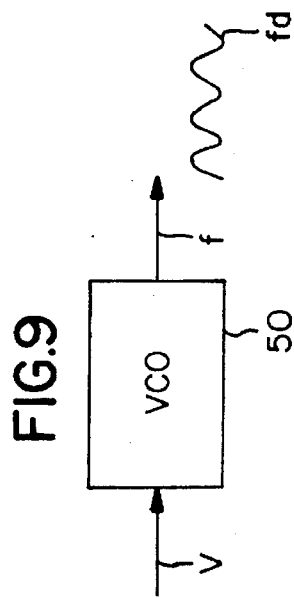
FIG. 9 is a block diagram illustrating a typical configuration of the interior of the frequency converter in the all optical regenerator shown in FIG. 4.

As illustrated in FIG. 9, first the monitor information 100 is converted into an electric signal to give a signal V. The signal V is entered into a voltage-controlled oscillator (VCO) 50, which converts the signal V into a signal f having a repetition frequency fd(Hz) corresponding to its voltage.

The signal f can be converted into the original monitor information at an optical terminal equipment by measuring its repetition frequency fd with a frequency counter.

Figure 10:
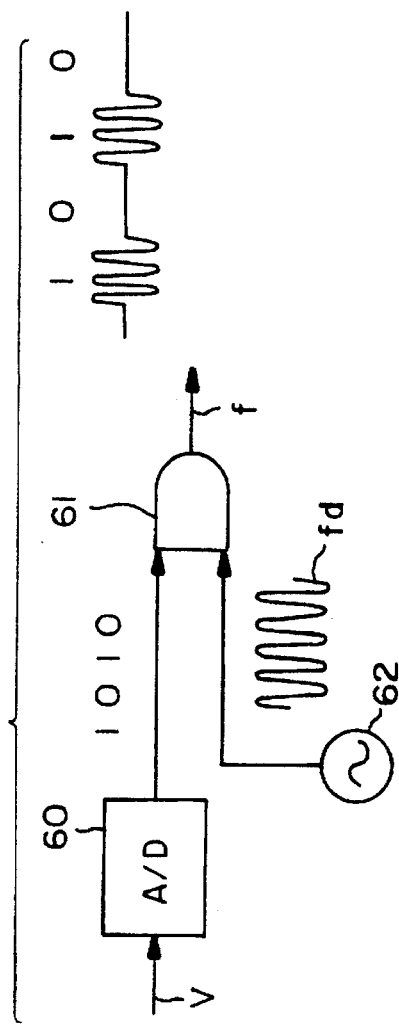
FIG. 10 is a block diagram illustrating another configuration of the interior of the frequency converter in the all optical regenerator shown in FIG. 4.

Further, as shown in FIG. 10, the signal V obtained by converting the monitor information into an electric signal is converted into a digital signal by an analog-to-digital (A/D) converter 60, and this digital signal, together with the oscillation output of an oscillator 62 (whose repetition frequency is fd(Hz)), is entered into an AND circuit 61. If, for instance, a set of data "1010" is entered into the AND circuit 61 as shown in the diagram, the waveform of the part of the signal f corresponding to a datum "1" will become the same as that of the oscillation output of the oscillator 62. The waveform of the part corresponding to a datum "0" will become a D.C. waveform.

The signal f can be converted into the original monitor information by the extraction of monitor signals at the optical terminal equipment. Thus, referring to FIG. 9, a control signal having a repetition frequency corresponding to the contents of the monitor information is generated. Referring to FIG. 10, a digital signal formed from the presence or absence of signals with a repetition frequency is generated.

Figure 11:
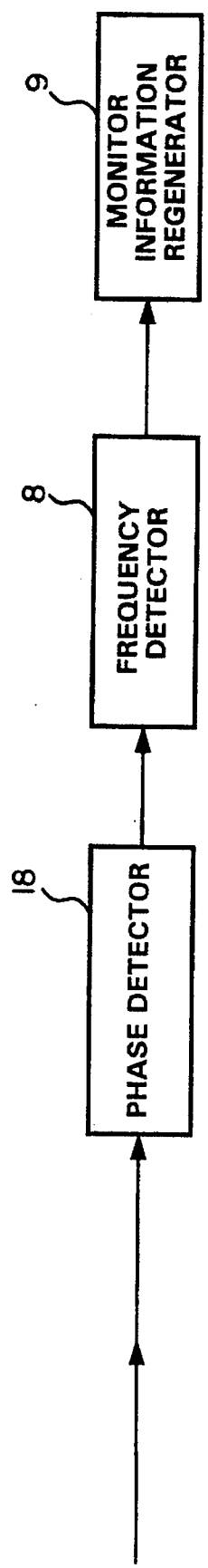
FIG. 11 is a diagram illustrating the configuration of optical terminal equipments in the monitoring system for all optical generators according to the invention.

Meanwhile FIG. 11 is a block diagram illustrating the configuration of an optical receiver arranged in an optical terminal equipment. The same parts as in FIG. 2 are denoted by respectively the same reference signs.

The optical receiver has a function to detect monitor signals superposed over optical signals in the above-described all optical regenerator. The optical receiver is provided with a phase detector 18, a frequency detector 8 and a monitor information regenerator 9. The phase detector 18 demodulates the phase-modulated optical signals coming incident from a transmission fiber, and converts them into electric signals. From the converted electric signals are extracted monitor signals by the detection of a specific frequency by the frequency detector 8. The monitor information regenerator 9 regenerates monitor information from the extracted monitor signals.

Over the optical signals coming incident from the transmission fiber are superposed monitor signals by phase modulation. By demodulating the monitor signals, monitor information representing the states of different parts in the all optical regenerator is provided to the optical terminal equipment, which can then monitor the state of each repeater according to the monitor information.

Now will be described the mode locked laser diode used in the monitoring system according to the invention. FIG. 12 shows an external view of the mode locked laser diode, which is caused to oscillate merely by the feeding of a bias current. Upon inputting of an optical signal, the mode locked laser diode restores the lost parts of the waveform of that optical signal, and outputs a clock optical signal synchronized with the repetition frequency of the optical signal. The mode locked laser diode here is described in "Electric and optical active control of 10 GHz monolithic mode locked semiconductor lasers" in the Technical Journal of the Institute of Electronics, Information and Communication Engineers, (LQE94-57, Yokoyama et al., 1994-11) (in Japanese).

As shown in FIG. 12, on the mode locked laser diode are formed electrodes 91 and 92 in addition to a grounding electrode 90. When a fixed bias current is fed to the mode locked laser diode via the grounding electrodes 90 and the electrode 91, clock optical signals having a fixed repetition frequency are outputted. If, then, an alternating current corresponding to monitor signals is inputted to the electrode 92, clock optical signals whose repetition frequency varies according to the repetition frequency of the alternating current fed to the mode locked laser diode 10 will be outputted. The variation of the repetition frequency of the clock optical signals here eventually means phase modulation of the clock optical signals.

If necessary, it may as well be that fixed bias currents are fed to the grounding electrode 90 and the electrode 92 and an alternating current corresponding to monitor signals is inputted to the electrode 91. Some mode locked laser diodes have more electrodes. In such a case, too, optical signals can be phase-modulated more effectively if the currents fed to the electrodes are adapted appropriately.

As described above, in this preferred embodiment of the present invention monitor signals are superposed by phase modulation. Not limited to this-method, Various other methods can be used for the transmission of monitor information. For instance, monitor signals can be superposed over main signals by varying the frequency of the optical signals' own light or varying the polarizing direction of light.

Although the foregoing description referred to optical submarine repeaters, it goes without saying that the invention is applicable to repeaters on shore as well.

As hitherto described, the monitoring system according to the invention can monitor all optical regenerators by delivering monitor information superposed over optical signals by phase modulation. This makes it possible to monitor the states of repeaters even in optical terminal equipments in distant locations.

While this invention has been described with reference to a preferred embodiment thereof, it is to be understood that the subject matter encompassed by this invention is not limited to this specific embodiment. On the contrary, it is intended for the subject matter of the invention to include all alternatives, modifications and equivalents that can be included within the spirit and scope of the following claims.

What is claimed is:

1. A monitoring system for all optical regenerators comprising:

at least one all optical regenerator including optical signal amplifying means for directly amplifying and outputting main optical signals, which are inputted, and including discriminating and regenerating means for discriminating and regenerating said main optical signals; and optical terminal equipments, connected to said all optical regenerator or regenerators, for delivering and supplying said main optical signals, wherein:

each of said all optical regenerators is provided with monitor information delivering means for superposing monitor information, representing internal information of said regenerator, over said main optical signals by phase modulation and delivering monitor optical signals, and each of said optical terminal equipments comprises monitor information extracting means for receiving said monitor optical signals and extracting said monitor information from them and monitoring means for monitoring said regenerator according to said monitor information.

2. A monitoring system for all optical regenerators, as claimed in claim 1, wherein:

each all optical regenerator is further provided with waveform reshaping means for reshaping the waveform of said main optical signals.

3. A monitoring system for all optical regenerators, as claimed in claim 1, wherein:

each all optical regenerator is further provided with retiming means for retiming said main optical signals.

4. A monitoring system for all optical regenerators, as claimed in claim 1, wherein:

each of said main optical signals contains a clock optical signal for giving a clock to this main optical signal, and said monitor information superposing means superposes said monitor information over said clock optical signals.

5. A monitoring system for all optical regenerators, as claimed in claim 4, wherein:

each all optical regenerator is further provided with optical branching/coupling means for branching and synthesizing said clock optical signals for said main optical signals and optical discriminating means for discriminating and regenerating said main optical signals.

6. A monitoring system for all optical regenerators, as claimed in claim 5, wherein:

said optical discriminating means includes AND means for subjecting said main optical signals and said clock optical signals to AND operation.

7. A monitoring system for all optical regenerators, as claimed in claim 5, wherein:

said said monitor information superposing means is further provided with:

a laser diode and laser diode controlling means for controlling the repetition frequency of bias signals to be fed to said laser diode according to the content of said monitor information.

8. A monitoring system for all optical regenerators, as claimed in claim 7, wherein:

said laser diode controlling means is further provided with:

an electric converter section for converting said monitor information into voltages according to its content;

a frequency converter section for converting each of said voltages into an electric signal having a repetition frequency corresponding to the voltage; and an amplitude controller section for controlling the amplitude of said electric signals.

9. A monitoring system for all optical regenerators, as claimed in claim 8, wherein:

said monitor information superposing means is further provided with:

a bias circuit for supplying a direct bias current of a fixed level;

an adder circuit for subjecting the bias current and the monitor signals, whose amplitude is controlled by the amplitude controller section, to level addition and outputting the resultant addition signals;

a laser diode driven by said addition signals.

10. A monitoring system for all optical regenerators, as claimed in claim 9, wherein:

said laser diode is a mode locked laser diode.

11. A monitoring system for all optical regenerators, as claimed in claim 8, wherein:

said frequency converter section includes a voltage-controlled oscillator.

12. A monitoring system for all optical regenerators, as claimed in claim 5, wherein:

said optical branching/coupling means is arranged downstream of said optical amplifying means, and includes a first optical directional coupler for branching one part of the amplified main optical signals, outputting branched amplified beams, and entering the other part of the branched amplified beams into said optical discriminating means; and a second optical directional coupler, connected to said first optical directional coupler and said laser diode, for bringing said main optical signals to incidence on said laser diode and outputting said monitor optical signals into said optical discriminating means.

13. A monitoring system for all optical regenerators, as claimed in claim 12, wherein:

each of said all optical regenerators is provided with second optical amplifying means downstream of said optical discriminating means.

14. A monitoring system for all optical regenerators, as claimed in claim 1, wherein:

said optical amplifying means includes an erbium-doped optical fiber amplifier.

15. A monitoring system for all optical regenerators, as claimed in claim 4, wherein:

said monitor information extracting means is provided with:

a phase detector section for demodulating received optical signals and converting them into demodulated electric signals;

a frequency detector section for detecting a specific frequency from said demodulated electric signals to extract said monitor signals; and a monitor information regenerator section for regenerating said monitor information from said monitor signals.

16. A monitoring system for all optical regenerators, as claimed in claim 1, wherein:

said monitor information delivering means is provided with monitor information superposing means for superposing said monitor information over said main optical signals by frequency modulation.

17. A monitoring system for all optical regenerators, as claimed in claim 1, wherein:

said monitor information delivering means is provided with monitor information superposing means for superposing said monitor information over said main optical signals by varying the polarizing direction of said monitor information.

18. A monitoring system for all optical regenerators, as claimed in claim 1, provided with:

a plurality of said all optical regenerators connected sequentially in one line from said optical terminal equipments.

19. An all optical regenerator provided with:

optical signal amplifying means for directly amplifying input main optical signals and outputting them;

optical discriminating/regenerating means for discriminating and regenerating said main optical signals; and monitor information delivering means for superposing monitor information representing internal information over said main optical signals by phase modulation to deliver monitor optical signals.

20. An all optical regenerator, as claimed in claim 19, further provided with:

waveform reshaping means for reshaping the waveform of said main optical signals.

21. An all optical regenerators, as claimed in claim 19, further provided with:

retiming means for retiming said main optical signals.

22. An all optical regenerator, as claimed in claim 19, wherein:

each of said main optical signals contains a clock optical signal for giving a clock to this main optical signal, and said monitor information superposing means superposes said monitor information over said clock optical signals.

23. An all optical regenerator, as claimed in claim 22, further provided with:

optical branching/coupling means for branching and synthesizing said clock optical signals for said main optical signals and optical discriminating means for discriminating and regenerating said main optical signals.

24. An all optical regenerators, as claimed in claim 23, wherein:

said optical discriminating means includes AND means for subjecting said main optical signals and said clock optical signals to AND operation.

25. An all optical regenerator, as claimed in claim 23, wherein:

said said monitor information superposing means is further provided with:

a laser diode and laser diode controlling means for controlling the repetition frequency of bias signals to be fed to said laser diode according to the content of said monitor information.

26. An all optical regenerator, as claimed in claim 25, wherein:

said laser diode controlling means is further provided with:

an electric converter section for converting said monitor information into voltages according to its content;

a frequency converter section for converting each of said voltages into an electric signal having a repetition frequency corresponding to the voltage; and an amplitude controller section for controlling the amplitude of said electric signals.

27. An all optical regenerator, as claimed in claim 26, wherein:

said monitor information superposing means is further provided with:

a bias circuit for supplying a direct bias current of a specified level;

an adder circuit for subjecting the bias current and the monitor signals, whose amplitude is controlled by the amplitude controller section, to level addition and outputting the resultant addition signals;

a laser diode driven by said addition signals.

28. An all optical regenerator, as claimed in claim 27, wherein:

said laser diode is a mode locked laser diode.

29. An all optical regenerator, as claimed in claim 26, wherein:

said frequency converter section includes a voltage-controlled oscillator.

30. An all optical regenerator, as claimed in claim 23, wherein:

said optical branching/coupling means is arranged downstream of said optical amplifying means, and includes a first optical directional coupler for branching one part of the amplified main optical signals, outputting branched amplified beams, and entering the other part of the branched amplified beams into said optical discriminating means; and a second optical directional coupler, connected to said first optical directional coupler and said laser diode, for bringing said main optical signals to incidence on said laser diode and outputting said monitor optical signals into said optical discriminating means.

31. An all optical regenerator, as claimed in claim 30, further provided with:

second optical amplifying means downstream of said optical discriminating means.

32. An all optical regenerator, as claimed in claim 19, wherein:

said optical amplifying means includes an erbium-doped optical fiber amplifier.

33. An all optical regenerator, as claimed in claim 32, wherein:

said monitor information extracting means is provided with:

a phase detector section for demodulating received optical signals and converting them into demodulated electric signals;

a frequency detector section for detecting a specific frequency from said demodulated electric signals to extract said monitor signals; and a monitor information regenerator section for regenerating said monitor information from said monitor signals.

34. An all optical regenerator, as claimed in claim 19, wherein:

said monitor information delivering means is provided with monitor information superposing means for superposing said monitor information over said main optical signals by frequency modulation.

35. An all optical regenerator, as claimed in claim 19, wherein:

said monitor information delivering means is provided with monitor information superposing means for superposing said monitor information over said main optical signals by varying the polarizing direction of said monitor information.

36. An all optical regenerator, as claimed in claim 19, wherein:

the monitoring system for all optical regenerators is provided with a plurality of said all optical regenerators connected sequentially in one line from said optical terminal equipments.

* * * * *